United States Patent [19]

Waloszyk et al.

[11] 4,084,332
[45] Apr. 18, 1978

[54] SYSTEM FOR VISUAL COMMUNICATION

[76] Inventors: John S. Waloszyk, 540 Wilder St.; Bernard W. Jacobs, 432 S. LaSalle St., both of Aurora, Ill. 60506

[21] Appl. No.: 775,390

[22] Filed: Mar. 7, 1977

[51] Int. Cl.² .............................................. G09B 3/08
[52] U.S. Cl. ........................................ 35/9 G; 35/26; 273/240; 428/29
[58] Field of Search ............ 35/9 G, 26; 106/21; 428/29; 101/426; 283/6, 8 R; 273/130 R

[56] References Cited

U.S. PATENT DOCUMENTS

| | | | |
|---|---|---|---|
| 2,420,336 | 5/1947 | Orchard | 101/426 UX |
| 2,857,698 | 10/1958 | Arthur | 428/29 |
| 3,363,338 | 1/1968 | Skinner et al. | 35/9 G X |
| 3,438,927 | 4/1969 | Ehrlich | 35/9 G X |
| 3,442,749 | 5/1969 | Ward et al. | 428/29 |
| 3,451,143 | 6/1969 | Thomas et al. | 35/9 G |
| 3,454,334 | 7/1969 | Ryan et al. | 35/9 G UX |
| 3,516,177 | 6/1970 | Skinner | 35/9 G |
| 3,632,364 | 1/1972 | Thomas et al. | 428/29 |
| 3,638,335 | 2/1972 | Gunderson et al. | 35/9 G X |
| 3,650,046 | 3/1972 | Skinner | 35/9 G |
| 3,677,786 | 7/1972 | Hollman et al. | 428/29 |
| 3,701,205 | 10/1972 | Wolff | 35/9 G |
| 3,725,104 | 4/1973 | Fraik | 35/9 G X |
| 3,745,672 | 7/1973 | Duskin | 35/9 G X |
| 3,788,863 | 1/1974 | Schever | 106/21 |
| 3,826,499 | 7/1974 | Lenkoff | 35/9 G X |
| 3,979,550 | 9/1976 | Panken | 35/9 G X |
| 3,990,156 | 11/1976 | Eigen | 35/9 G |

OTHER PUBLICATIONS

IBM Technical Disclosure Bulletin, vol. 13, No. 10, Mar. 1971, "Test Score Form," p. 2966.

*Primary Examiner*—William H. Grieb
*Attorney, Agent, or Firm*—Thomas E. Frantz

[57] ABSTRACT

A system for visual communication, the system being particularly useful in designing and producing games, puzzles, autocorrective tests, programed teaching materials, coloring sets or sheets, graphic arts supplies and various other educational, game and amusement devices.

The system involves a substrate defining a marking surface, at least one visible stable dye, at least one normally visible reactive dye of a color different than that of the stable dye, an activator chemically isolated from at least the reactive dye prior to use of the system, and a solvent common to both the dyes and activator. In operation the system involves the steps of applying at least one of the dyes to a selected area of the marking surface to form a first visible indicium thereon, and of bringing the dyes and activator into contact with one another in at least a portion of the selected area in the presence of the solvent, such contact resulting in a reaction between the reactive dye and activator to change or eliminate the color of the reactive dye, thereby providing a second visible indicium of a color distinctly different than that of the first visible indicium.

20 Claims, 3 Drawing Figures

U.S. Patent     April 18, 1978     4,084,332
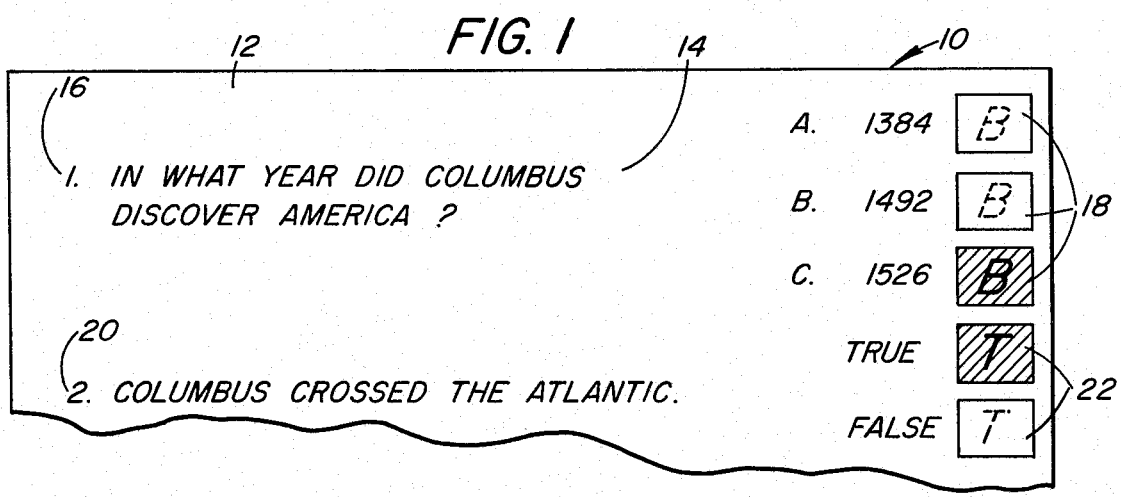
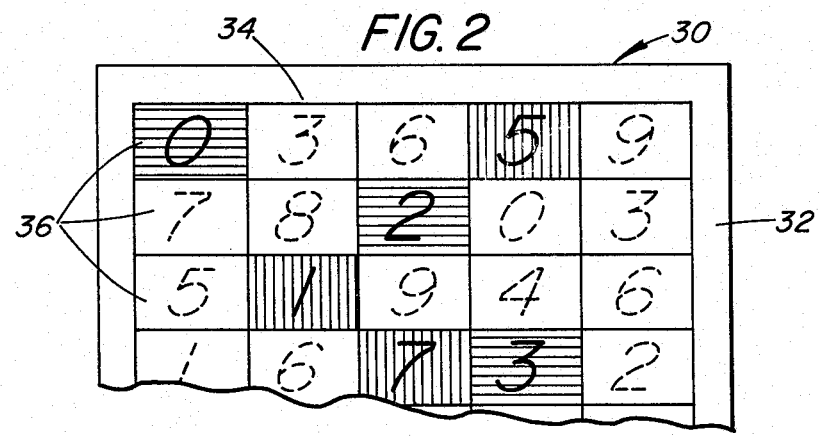
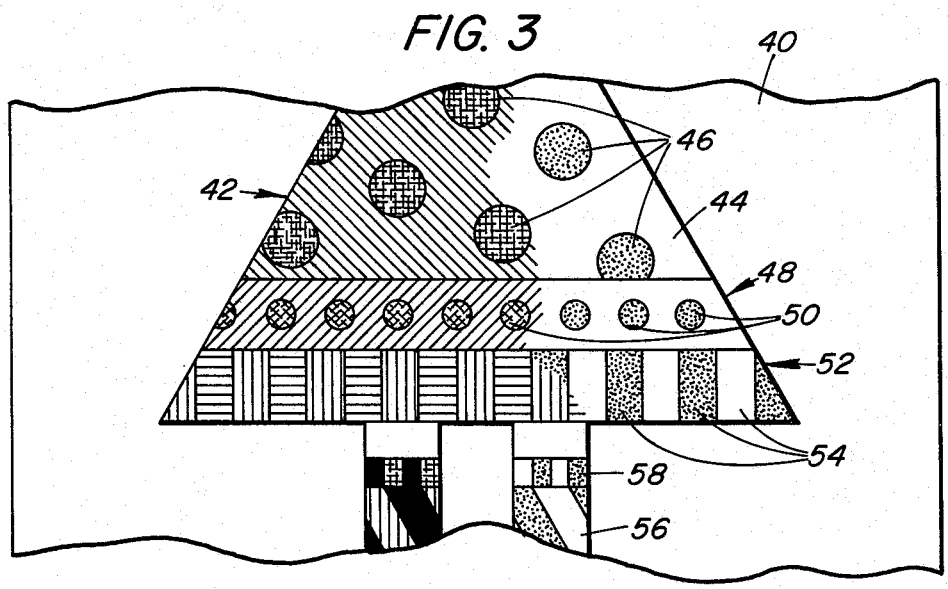

SYSTEM FOR VISUAL COMMUNICATION

BACKGROUND OF THE INVENTION

1. Field of the Invention

The present invention is applicable to a variety of educational, game, amusement and graphic arts products and devices. More particularly, it relates to a new system of visual communication wherein a paper or similar substrate is provided with a marking surface having at least one area intended to be marked by the user to produce a first visible indicium in response to a question, instruction or other stimuli. As a result of this response, a second visible indicium is automatically and promptly generated in that area. This second indicium visually communicates to the user and others knowledge as to the correctness or value of his response, or pleasure in seeing an unexpected or aesthetically pleasing change in the area marked.

2. Description of the Prior Art

Referring first to the educational field, many proposals have been advanced in the past for the use of invisible ink or concealed printing in preparing auto-corrective tests, programed teaching courses, and other similar instructinal devices intended to provide feedback to the student and teacher. In this context, the term "feedback" is defined as a transfer of information from the instructional device to the student and/or teacher after a response has been made by the student. Such prior proposals usually have required development of the invisible ink or revelation of the concealed printing through a chemical, electrical or mechanical reaction between a device operated by the student and the information concealed on the paper. The following United States Patents disclose systems representative of such prior proposals: U.S. Pat. Nos. 3,826,499; 3,701,205; 3,632,364; 3,788,863; 3,677,786; 3,438,927; 3,745,672; 3,638,335; 3,363,338; 2,420,336. At best, these proposals have met with very limited success. One of the major difficulties involved in using an invisible ink is in applying it in such manner that it truly is invisible. Otherwise, one who is taking a test, or the like, may quickly discover slight visual clues as to location of the ink and thereafter depend upon such clues in responding to a question or instruction.

Another problem with many invisible inks resides in the difficult or inconvenient procedures involved in developing them to a visible state. For instance, some systems require acids or special lights that are not readily available to the average user. Others require the application of water as by dipping, wiping or spraying, thereby producing a wet sheet which is difficult and messy to handle. Still others require the use of special developer fluids and/or applicators which are not readily available, which present problems of toxicity, or which are impractical because they have no real utility except as developers.

As a result of such problems with invisible inks, various proposals have been advanced for using concealed printing. For instance, systems have been devised incorporating water soluble dyes in printing inks, the dyes dissolving to provide a color response upon being contacted by a water filled pen or brush. Other proposed systems have involved an overlay which is erased or scraped away to reveal the preprinted answer. Here again, however, these proposals have met with little long term success because of such problems as "registry" in making multiple runs of a product through a printing press, high costs, difficulty in use, etc.

Thus, in spite of many development efforts and the expenditure of substantial time and money over the years, the educational field still lacks a truly satisfactory system for selfcorrecting tests and the like which is cheat proof, safe and convenient in use, and efficient and effective yet inexpensive and easily produced.

Turning now to games, puzzles, amusement devices, and the like, this field has experienced many of the same problems as noted above with respect to the educational field. A game or puzzle having answers printed in so-called invisible ink many times will give visible "clues" which can be utilized to win unfairly or gain some advantage. Also, the development of such inks leaves much to be desired as it normally requires a special chemical, applicator or treatment which may not be readily available, dangerous to a young user or messy or inconvenient. For instance, some invisible inks are developed by heat, as by being held over a candle or other heat source. Obviously, such a procedure not only may lead to destruction of the paper on which the invisible message is written, but involves significant danger to the user and adjacent objects in the event of unexpected ignition of the paper.

Also, with particular reference to coloring sets or books of the type used primarily by children, there has been little if any change for a great many years. The usual coloring book consists — as it has for many years — of sheets having printed outlines which are simply filled in with wax crayons, a brush dipped in water colors, and the like.

One proposal to improve the usual coloring procedure involves printing "dots" within the area to be colored, using a black printing ink in which water soluble dyes have been suspended. When these "dots" are contacted by a water filled brush or the like, the suspended dyes dissolve and the area is then colored by moving the brush thereover. Because of the lack of any choice or variety in color selection by the user and of very weak "colors" resulting from this process, however, it has met with only limited success.

In considering the general graphic arts field, one of the oldest and most perplexing problems experienced by artists, designers, and others involved in layout work is encountered in attempting to quickly and inexpensively prepare designs, drawings, copy, etc., in what might be called "two color" reverse. For example, preparation of a simple design including vivid green lines on a red background normally would require such complicated and time consuming procedures as (a) starting with a white sheet, inking in the green lines and then inking in the solid red background, (b) starting with a sheet having an overall red coating, erasing or otherwise removing the coating from the areas intended to represent the green lines, and then inking or otherwise applying green into these areas, or (c) starting with a red sheet, carefully cutting out the areas intended to form the green lines, and then either cutting out and inserting the green lines or placing a green sheet beneath the red sheet.

As a result of the difficulty attendant to the preparation of such "two color" reverses, they are seldom used except in cases of extreme urgency. Practically any artist, designer, or other individual involved in layout work, however, would welcome and frequently use a system by which such a "two color" reverse could be inexpensively, and quickly prepared.

SUMMARY OF THE INVENTION

It is a principal object of this invention to provide a new and improved system adapted particularly for use in designing and producing games, puzzles, auto-corrective tests, programed teaching materials, coloring sets or books, graphic arts materials and similar devices of the type involving the communication of information or visual impressions to the user.

Another object of this invention is the provision of an improved system for visual communication, wherein a response or deposit by the user will automatically and promptly provide feedback of information or a different visual impression.

Yet another object of this invention is to provide an improved visual communication system including a printed deposit which is invisible or indiscernable prior to use.

A still further object of this invention is the provision of a communication system employing a substantially colorless solution adapted for application to a paper surface using high speed commercial printing presses.

A still further object of this invention is the provision of a communication system which utilizes common materials of a non-toxic nature, which is inexpensive to manufacture, which is simple yet reliable in use and which is rapid in reacting to provide prompt feedback of information or visual impressions to the user.

These and various other objects of the present invention are achieved by (1) selecting at least one visibly stable dye, (2) selecting at least one normally visible reactive dye, (3) selecting an activator which has no significant effect on the stable dye but which is capable of reacting with the reactive dye to change or eliminate its color, (4) selecting a solvent in which the stable and reactive dyes and the activator are soluble, (5) depositing the reactive dye, the stable dye and the activator on the surface of a substrate, and (6) bringing the dyes and activator together in at least one selected area of the surface in the presence of the solvent whereby the reactive dye will significantly change or lose its color to provide an indicium which is visibly different than the indicium created by the combination of the stable and reactive dyes outside the selected area.

DEFINITIONS

Throughout the specification and claims of this application, it is to be understood that the following definitions are inntended:

(A) *Substrate* shall mean an article formed of paper, cloth, wood, fiber, plastic, or other rigid or flexible material, or any combination thereof, having a marking surface.

(B) *Marking Surface* shall mean either a flat or configured surface area of a pervious, porous or textured nature which is suitable for the reception of and on which an ink or similar material may be deposited.

(C) *Solvent* shall mean a liquid in which both the dyes and activator of this invention are soluble; the solvent may consist essentially of a single liquid such as water, or it may be a compound of two or more liquids which are miscible with one another and are selected to provide optimum solubility of such dyes and activator.

(D) *Activator* shall mean a compound of one or more chemicals soluble in the solvent selected for use in the system of this invention, the activator (i) being substantially colorless and drying to an invisible or indiscernable deposit when applied to a marking surface, (ii) having substantially no visible effect on the color of one class of dyes which are soluble in such solvent, and (iii) reducing, oxydizing or otherwise reacting with a second class of dyes which are soluble in such solvent to visibly change the color of or render such dyes substantially colorless.

(E) *Stable Dye* shall mean a dye which shows little or no visible color change when contacted with the activator of this invention in the presence of a common solvent.

(F) *Reactive Dye* shall mean a dye which either loses its color or changes to a significantly different color when contacted with the activator of this invention in the presence of a common solvent.

(G) *Indicium* shall mean any mark, line, or other visually discernable trace, spot, section, feature, or character, whether or not forming an intelligible word, number, letter, figure, etc., which is produced or formed on the marking surface as a result of the use of the system of this invention.

DESCRIPTION

SYSTEM

Continuing now with a more detailed description of the system provided by the present invention, it will be apparent from the preceding discussion that certain factors are to be observed in designing and producing a product embodying the present system.

First, both the activator and dyes used in the system should be soluble in a common solvent to assure the necessary reaction when these components are brought into contact with one another in the presence of the solvent. The solvent should be of a type that will dry relatively rapidly on the marking surface by evaporation, absorption, or both. Further, for reasons which will be apparent from the following description, the solvent should be substantially colorless when applied to the marking surface.

Distilled or deionized water has been found to exemplify an aqueous solvent suitable for use in the present invention.

Secondly, two types of dyes are to be selected for use in preparing any of the various embodiments described hereinafter. One type is a stable dye and the other a reactive dye. These two types of dyes should not be of the same color, as mixing of the two together in a common solvent should produce a color which is different than that of either of the two dye types. For instance, use of a stable yellow dye and a reactive blue dye will result in a green "starting" color. When this green color is brought into contact with the activator, the blue dye will be rendered substantially colorless, thereby leaving only the original yellow dye as a visible trace or as the "end" color.

For many purposes, as with tests, educational aids, and the like, simple two color dye mixture will be found satisfactory. In other instances, however, where aesthetic factors may be important, as with coloring sets, illustrations, games, etc., a greater range of both "starting" and "end" colors are desirable. As will be understood by those in the art, such additional colors can be obtained readily by properly selecting and mixing one or more dyes from each of the following types:

| Stable Dyes | Reactive Dyes |
| --- | --- |
| Red | Red |
| Yellow | Yellow |
| Blue | Blue |

For example, by combining red and blue stable dyes with a yellow reactive dye, a black color will be provided. This color will be rendered purple upon contact with the activator component. Combining a blue stable dye with red and yellow reactive dyes will give a black color which will be rendered blue upon being contacted by the activator. Yet another black component can be provided by use of a yellow stable dye and red and blue reactive dyes, this component leaving a yellow trace upon contact with the activator.

In the same manner, it is possible to select dyes which will provide practically any "starting" color or any "end" color.

Referring now to the activator, a material found to be useful as an activator in the preferred system is sodium sulfite ($Na_2 SO_3$), a white crystalline solid which is readily soluble in water and other aqueous solvents. Sodium sulfite is considered non-toxic, being used widely as a food additive, and hence is particularly advantageous as the activator in any products intended for use by young children. For the same reason, of course, the dyes used in connection with this invention preferably should be of a non-toxic or pure food grade. However, in the case of tests, educational aids and other products intended for advanced students or adults, this factor of toxicity would be of somewhat less significance.

Although sodium sulfite performs well as an activator material, it has been found to have one drawback. It is somewhat unstable and tends to lose its potency or effectiveness upon exposure to high humidity or storage under atmospheric conditions for extended periods. When subjected to contact with moist air, it gradually breaks down or changes to a sulfurous acid and then degrades further to water and sulfur deoxide gas. As this breakdown and degradation occur, of course, the reactive ability of the activabor will gradually decrease. Thus, if a product produced according to this invention is likely to be stored under conditions involving high humidity or extended time periods, it has been found desirable to include in the activator with the sodium sulfite a quantity of sodium bisulfite ($NaH SO_3$), sodium metabisulfite ($Na_2 S_2 O_5$), or both.

While neither sodium bisulfide or sodium metabisulfite would be satisfactory, per se, as the initial activator material, both have the characteristic of gradually changing or degrading into a composition comprising sodium sulfite. Sodium bisulfite might be characterized as being one reaction step away from sodium sulfite. Thus, as the original sodium sulfite in the activator is losing its potency, the sodium bisulfite is converting to sodium sulfite to reinforce or replace that potency. Sodium metabisulfite is what might be called two reaction steps away from sodium sulfite — first changing to a composition comprising sodium bisulfite and then to one comprising sodium sulfite. Thus, as the sodium sulfite from the sodium bisulfite is losing its potency, the sodium metabisulfite is then changing to sodium sulfite to again reinforce or replace that potency. In effect, therefore, the sodium sulfite of the activator is continuously replenished for a substantial period of time.

It will be understood, of course, that it is not necessary to use both the sodium bisulfite and sodium metabisulfite if simple storage and use tests show that one or the other will adequately extend the activator life of the product involved. Or in some cases neither may be necessary if the product is not expected to be stored for more than a few months. Here again, however, simple storage and use tests will adequately indicate whether the addition of the bisulfite and/or metabisulfite may be desirable.

Referring to the factor of solubility, it has been found that solubility and shelf life of the activator is best if the solvent is maintained in a PH range of 8 to 11. It has further been found that the reactive dye or dyes used in this system preferably are of the basic type with solubility. Examples of such dyes would include Keco Soluble Blue 3 RPA ex, Keystone Soap Blue LPN, Bozo Magenta Red, and High Soluble Rhodamine Red.

In addition, it has been noted that if the PH of the solvent is on the basic or alkaline side at the time the activator and reactive dye are placed in contact with one another, the reaction of the dye or dyes is rapid and complete. The reaction is measurably slower if the PH of the solvent is below about 4. In some cases, should a slow reaction be desired, the solvent could readily be buffered to a low PH range.

In certain embodiments of this invention, the activator will be printed or similarly applied to the marking surface, in which case it is important that the deposit not be visible. Thus, when initially setting up a printing press for applying the activator, a few sample sheets should be prepared, permitted to dry and then inspected to insure against any evidence that the dry activator residue is visible. If any trace of the activator should be noted, the press should be adjusted to reduce the contact pressure and/or the quantity of deposit on the marking surface.

PREFERRED EMBODIMENT

In carrying out the preferred embodiment, the activator is prepared as a colorless or substantially colorless compound including an aqueous solvent, sodium sulfite, a thickening agent, and a buffering agent as necessary. The thickening agent is used to increase the viscosity of the activator compound to permit its use in a commercial printing press. Also, a preservative may be added.

More particularly, the activator compound may be prepared by dissolving approximately 7.5 parts (by weight) of sodium sulfite in approximately 87.3 parts of deionized or distilled water. Approximately 5.0 parts of a thickening agent and 0.05 to 0.1 parts of tragacanth gum are then added and thoroughly stirred into the mixture. A desirable thickening agent for this use is Carbopol 960, a product of B. F. Goodrich. A preservative such as 0.1 parts of sodium benzoate may also be added and, if necessary, the compound may be buffered to stabilize and maintain the desired PH range by adding an appropriate amount of sodium hydroxide or ammonium hydroxide.

Should shelf life tests indicate that the above described activator degrades too rapidly for the product involved, the water may be reduced sufficiently to add the activator between 3.75 and 4.00 parts of sodium bisulfite, sodium metabisulfite, or both. As explained above, these latter two materials are included for the purpose of extending the shelf life or potency of the activator by providing a continuing supply of sodium sulfite over a substantial period of time.

The resultant activator compound may then be applied to one or more selected areas of a sheet of paper by any one of a number of well known printing processes. For example, a Harris Offset Press Model LUH-120 (Harris Seybold Co., Cleveland, Ohio) is satisfactory for this application, the actual printing being done by the dry-offset process.

As pointed out above, if contact between the printing plate and the paper is too heavy, of if too heavy a coating of the activator compound is applied, there may be some tendency for the finished sheet to show the location of the activator even after the water or other solvent has evaporated and/or absorbed into the paper. Thus, when initially setting up the printing press, a few sample sheets should be run and inspected, and the press adjusted if necessary.

As those in the art will understand, paper stock of various sizes, weights, finishes and colors may be used in the printing of the activator. When initially selecting a paper stock or in changing from one stock to another, it of course will be necessary to prepare and inspect printed samples using the proposed stock. Experience has shown, however, that 50 lb. Beckett Cover stock will serve satisfactorily for this purpose.

In certain instances, the paper sheet will carry on at least one surface visible printed indicia such as game instructions and format, a series of questions and boxes for marking true or false or multiple choice answers, an outline defining areas to be colored, etc. Generally speaking, it is preferred that this visible indicia be applied to the paper before application thereto of the activator. In any event, however, care must be used by the pressman to insure that the visible indicia and invisible activator are registered properly on the sheet relative to one another.

Examples of products prepared in accordance with the preferred embodiment of the present invention are set forth below:

BRIEF DESCRIPTION OF THE DRAWINGS

FIG. 1 is a schematic illustration of a portion of a test paper containing a multiple choice question and a "True-False" statement, an answer in each case being indicated in an accompanaying group of answer-feedback boxes;

FIG. 2 is a schematic illustration of a portion of a game sheet containing a multiplicity of squares each containing an initially "hidden" number, several of the squares being marked to visually indicate the number contained therein; and FIG. 3 is a schematic illustration of a portion of a sheet from a coloring book, containing a section of a figure which is partially colored.

EXAMPLE I

Referring now more particularly to FIG. 1 of the drawing, there is illustrated a portion of a test paper 10 consisting of a substrate 12 which is provided with a porous marking surface 14 suitable for the reception of printing inks, marker fluids and the like.

Printed on sheet 12 with a standard printing ink is a question 16 having three possible answers A, B and C, each accompanied by an answer box 18. Also printed on sheet 12 is a statement 20 accompanied by "True" and "False" answer boxes 22. As will be obvious, one each of the answer boxes 18 and 22 are to be filled in by the student or other individual taking the test to indicate his answer or response.

In each of the answer boxes 18 and 22 the correct answer or response is printed with an activator compound as described hereinabove. Although this activator compound is indicated in boxes A18, B18 and False 22 by dotted lines for illustrative purposes, it will be understood that the dried activator should not be visible even when inspected closely under various light conditions.

Each individual taking the test is given a felt or fiber tip type marking pen containing an ink of the type described above, which in this example may consist essentially of the following:

|  | By weight |
|---|---|
| Keystone Soap Fast Red 98P | 2% (Stable) |
| Keystone Soap Fast Yellow N.F. | 2% (Stable) |
| Keystone Soap Fast Blue LPN | 2% (Reactive) |
| Water | 94% |

Such an ink will be brown in color but change to a bright orange when brought into contact with the activator. Thus, as indicated in FIG. 1, upon filling in answer boxes C18 and True 22, a brown mark or first indicium will be produced. Where the reactive dye in this mark contacts the activator used in printing the invisible answers, however, a bright orange will rapidly appear thereby providing a visually different second indicium. This second indicium provides an immediate feedback of the correct answer or response even should the incorrect selection be made, as in the case of question 16.

As will be apparent, one of the advantages of this embodiment is the impossibility of cheating on the part of the student. Any contact between the pen and paper will be obvious to the instructor, so the student cannot "try" a couple of the answer boxes before committing himself on one answer.

EXAMPLE II

FIG. 2 illustrates a portion of a game sheet 30 consisting of a paper substrate 32 provided with a marking surface 34 having printed thereon a visible grid which defines a plurality of squares 36. Each square 36 contains a randomly selected number, printed with an activator of the type described hereinabove. As in the case of Example I, the activator is invisible on the surface 34, but is indicated by dotted lines for illustrative purposes.

Two or more players may participate in this type of game, each player preferably being given a marking pen containing a different colored "Starting" ink of the type described above. In the game sheet illustrated in FIG. 2, however, two players are indicated as participating— one using a blue "starting" ink and the other a red ink. As each player alternately selects and colors in a square, his particular color of starting ink provides a first indicium which clearly distinguishes his squares from those of his opponent. Further, as the ink is applied to a square, that portion contacting the invisible activator will rapidly turn a second color to provide a second indicium which indicates the value of that square. Such second indicium is represented in FIG. 2 by the solid line numbers. After all squares have been colored in, the winner is determined as the player having the highest score based on the sum of the "hidden" numbers he uncovered.

EXAMPLE III

A coloring book or set may be prepared containing a multiplicity of sheets on each of which is printed a figure to be colored, such as that partially illustrated in FIG. 3.

In this FIGURE, the sheet 40 has printed thereon a figure 42 of a girl wearing a skirt with an upper section 44 containing a random pattern of polka dots 46, a mid section 48 containing a line of small dots 50, and a lower hem 52 defining a pattern of stripes 54. On the legs of the girl are illustrated knee-type stockings 56 having a "candy stripe" pattern terminating in an upper hem 58 with vertical stripes.

Inside the polka-dots 46, small dots 50, and alternate stripes 54 is an invisible coating of activator of the type described heretofore. On the right hand uncolored side of the figure 42, this invisible activator is represented for illustrative purposes only as dotted strippling. Such activator is also printed in alternate stripes in the stockings 56 as represented by the strippling therein.

Pens containing different colors of ink prepared according to this invention are used in coloring the girl's clothing. For instance, the skirt portion 44 is colored with a pen containing green "starting" ink which changes to yellow within polka-dots 46; the portion 48 is colored with a brown "starting" ink which changes to orange within the small dots 50; the lower hem 52 with a blue "starting" ink which changes to red in alternate stripes 54; the upper stocking hems 58 with a black "starting" ink which changes to yellow in alternate stripes; and the stockings 56 with a second black "starting" ink which changes to red in alternate stripes. Thus, by using only 5 different "starting" inks, an array of 10 different colors are produced in the FIG. 42. In each case, the first indicium is produced by the ink outside of the areas containing the activator, with the other or second indicium being produced where the reactive dye contacts the activator.

Although the above described FIG. 42 shows the polka dots 46, small dots 50, stripes 54 and stocking stripes as being outlined by standard printing ink, such outlines are not necessary as the activator can simply be printed on the figure as invisible dots and stripes which become visible as coloring of the figure progresses.

Other Embodiments

As will be apparent, the system provided by this invention does not require that just the activator be printed or deposited on the marking surface and the dyes subsequently applied thereto as by a marking pen or the like. Instead, as will be described in the following examples, the reactive dye may be pre-deposited on the marking surface and the activator and stable dye subsequently deposited thereon to develop visually different first and second indicium.

EXAMPLE IV

A layout kit for artists, designers, etc., may be prepared by completely coating the marking surface of a suitably sized sheet of paper with a reactive dye, or combination of reactive dyes, of the desired "background" color. This coating or "background" comprises the first indicium in this embodiment.

A marker pen or the like is then filled with a solution including one or more stable dyes, sodium sulfite, and an aqueous solvent.

Upon drawing the tip of the marker over an area of the coated sheet, the solution of stable dyes and sodium sulfite will be deposited thereon. The reactive dye on the area of the sheet contacted by the marker will be rendered colorless upon reaction with the sodium sulfite. Thus, the stable dye deposited by the marker will be visible in its true color as the second indicium. A two color reverse layout can be made in this manner quickly, inexpensively, and conveniently.

This system may be used to make "reverse" layouts of practically any color combination or combinations since the background is rendered colorless and does not interfere with the appearance or color of whatever stable dye or dyes may be deposited thereon. For instance, the paper surface may have a coating formed by a dark blue reactive dye, and the pen may deposit a bright yellow stable dye. Normally, a yellow placed over a dark blue would produce a dull green line, but by use of the system of this invention, the yellow will retain its original vivid color.

Further, by employing several markers, each containing a different color of stable dye, a reverse layout may be provided with various colors of lines.

Also, this embodiment is not limited to use in making layouts, but can be employed in providing many types of colorful signs, showcards, Christmas cards, etc.

EXAMPLE V

Amusement devices can be provided by using a sheet precoated with a reactive dye, as in Example IV. The stable dye and sodium sulfite may be placed in a soap solution and then deposited on the sheet as by blowing it from a bubble pipe. This will produce first and second indicium on the paper in accordance with the patterns created by the bursting of the bubbles upon contact with the paper.

EXAMPLE VI

Other amusement devices may be provided by using a sheet pre-coated with a reactive dye, as in Example IV. The stable dye and sodium sulfite may be mixed and placed in a dish or pan, and a leaf, flower, a hand, or other object dipped thereinto and then placed on the sheet to create a "reverse" image of the object.

Using the same system, a form of finger painting may be accomplished, the hand being dipped in the sodium sulfite/stable dye solution and then moved over the coated sheet to create patterns thereon.

Other embodiments of this invention provide yet further types of amusement and educational devices wherein a pre-printed object on the marking surface may be made to change its entire appearance or character. In such embodiments, an object is first printed on the surface using a stable dye or a mixture of stable and reactive dyes. A second object, or a modified form of the first object, is then printed over the original object using either a reactive dye or a mixture of stable and reactive dyes. The original "hidden" object may then be made to appear by scribbling thereon with an applicator containing sodium sulfite. The following examples describe such embodiments:

EXAMPLE VII

A coloring sheet is prepared illustrating what appears to be a black silhouette of a flower, the extreme outside edge of the silhouette being printed with stable dye. The inside of the stem of the flower is printed with a mixture of stable and reactive dyes having an initial black color but changing to green upon contact with the activator. One of the petals of the flower is printed with a dye mixture having an initial black color but changing to red upon contact with the activator. Yet other petals are printed with other mixtures of stable and reactive dyes, each of which initially appears black but changes to various other colors upon being contacted by the activator. Since both the outline of the stem and flower and the various parts within the outline are black, the flower appears as a silhouette.

Upon contacting the flower with a marking pen, brush, etc., containing the activator component, the various dye mixtures will immediately change to their "end" colors, to provide a multi-colored flower with a green stem.

EXAMPLE VIII

A picture is made to appear to change character by printing a happy, smiling face with a mixture of reactive and stable dyes which initially is black but changes to yellow. Printed over this "happy" face is an "unhappy" face using a reactive dye mixture which is initially black but which becomes substantially colorless to permit the above-mentioned yellow to show through when the face is contacted by a marker or small brush dipped in a solution of the activator component.

It will be seen from the preceding description and examples that the components forming the system of the present invention may be employed in various combinations to provide a wide variety of puzzles, games, amusement devices, educational aids and the like. Accordingly, it will be understood that the specific materials, compositions and mixtures, formulae and descriptions given hereinabove are in no way limiting, the invention being limited only by the scope of the appended claims.

What is claimed is:

1. A system for visual communication comprising:
    (A) a substrate defining a marking surface,
    (B) a visible stable dye,
    (C) a normally visible reactive dye of a color different than that of the stable dye,
    (D) an activator chemically isolated from said reactive dye prior to use of the system, and
    (E) a solvent common to both the said dyes and the said activator,
    (F) at least one of said dyes being deposited on said surface to form a first visible indicia thereon,
    (G) the said other dye being deposited on said surface,
    (H) said activator changing or substantially eliminating the color of said reactive dye upon contact between said activator and said dyes in the presence of said solvent,
    (I) said stable dye retaining substantially its original color during said contact to provide a second indicium on said surface of a color distinctly different than that of the first indicium.

2. A system according to claim 1 wherein said dyes and said activator are substantially soluble in an aqueous liquid.

3. A system according to claim 2 wherein said liquid consists essentially of water.

4. A system according to claim 2 wherein said activator comprises sodium sulfite.

5. A system according to claim 4 wherein said activator comprises a mixture of sodium sulfite and sodium bisulfite.

6. A system according to claim 4, wherein said activator comprises a mixture of sodium sulfite and sodium metabisulfite.

7. A system according to claim 4, wherein said activator comprises a mixture of sodium sulfite, sodium bisulfite and sodium metabisulfite.

8. A system according to claim 4, wherein said activator is the dry residue of a substantially colorless solution applied initially to said surface in liquid form.

9. A system according to claim 8, wherein said liquid consists essentially of water and said activator comprises sodium sulfite.

10. A system according to claim 9, including a manually manipulative applicator, said dyes being carried by said applicator in the form of an aqueous solution applicable to said surface upon contact between said surface and said applicator.

11. A system according to claim 10, wherein said manually manipulative applicator includes
    (A) a reservoir and point having a multiplicity of intercommunicating capillary spaces,
    (B) said aqueous solution being carried in said spaces and adapted in viscosity for release therefrom in response to contact of said point with said surface.

12. A system according to claim 10, wherein said substrate consists of a sheet of paper, said paper including visible printing which defines at least one selected area on said marking surface in which said activator is deposited.

13. A system according to claim 1 wherein
    (A) said reactive dye is carried by said marking surface to form said first visible indicia, and
    (B) said stable dye and said activator are deposited simultaneously on said surface in contact with each other and with said reactive dye in the presence of said solvent to form said second visible indicium.

14. A system according to claim 13, wherein said reactive dye covers substantially the entire area of said marking surface whereby said first indicium comprises a solid colored background over said surface.

15. A system according to claim 14, wherein said stable dye and said activator are deposited on said surface from a manually manipulative applicator.

16. A system according to claim 14, wherein said stable dye and said activator are deposited on said surface in a random pattern from a projecting device spaced therefrom.

17. A system according to claim 14, wherein said stable dye and said activator are deposited on said surface by transfer from an article which carries a coating of said dye and activator and which is pressed onto said surface.

18. A system according to claim 13, wherein
    (A) said substrate consists of a sheet of paper and said surface is pervious,
    (B) said dyes and said activator are soluble in a common aqueous solvent,
    (C) said reactive dye forms a dry coating covering substantially the entire area of said surface and defines said first visible indicia,
    (D) said stable dye and said activator form a mixture carried by a manually manipulative marker,
    (E) said mixture being deposited by said marker on said marking surface to form said second visible indicium.

19. A system according to claim 1, wherein
    (A) said stable dye is deposited on said surface to form a design thereon, (B) said reactive dye is deposited on said surface to form a second design thereon,
(C) said second design overlaying and substantially obscuring said first design,
(D) said activator is dissolved in said solvent, and
(E) said activator being deposited on said surface over said designs whereby said second design is substantially eliminated to permit visual viewing of the first design.

20. A system according to claim 1, wherein
(A) an outline is printed on said surface to define at least two selected areas thereon,
(B) a first stable dye and a first reactive dye are selected to substantially match the color of said printed outline, said selected dyes being dissolved in said solvent and deposited on one of said areas,
(C) a second stable dye differing in color from the first stable dye and a second reactive dye differing in color from said first reactive dye are selected to substantially match the color of said printed outline, said second selected dyes being dissolved in said solvent and deposited on another of said areas, and
(D) said activator is applied to each of said areas to substantially eliminate the color of the reactive dye in each whereby the stable dyes of differing colors are rendered visible within said printed outline.

* * * * *